United States Patent [19]

Aulich et al.

[11] 4,410,346
[45] Oct. 18, 1983

[54] METHOD FOR MANUFACTURING DISTRIBUTOR AND MIXER ELEMENTS FOR OPTICAL COMMUNICATION TECHNOLOGY

[75] Inventors: Hubert Aulich, Munich; Karl-Heinz Eisenrith, Schliersee, both of Fed. Rep. of Germany

[73] Assignee: Siemens Aktiengesellschaft, Berlin & Munich, Fed. Rep. of Germany

[21] Appl. No.: 291,019

[22] Filed: Aug. 7, 1981

[30] Foreign Application Priority Data

Sep. 17, 1980 [DE] Fed. Rep. of Germany ....... 3035089

[51] Int. Cl.³ .................. C03B 37/025; C03B 37/075
[52] U.S. Cl. ......................................... 65/4.2; 65/13; 65/36
[58] Field of Search ............... 65/4.2, 4.21, 4.3, 13, 65/36, 152; 350/96.15

[56] References Cited

U.S. PATENT DOCUMENTS 3,920,432 11/1975 Smith ................................... 65/4.21
3,930,714 1/1976 Dyott .................................... 65/4.3
4,083,625 4/1978 Hudson ............................. 350/96.15
4,229,197 10/1980 Streng ................................... 65/4.2

OTHER PUBLICATIONS

M. K. Barnoski et al., "Fabrication of an Access Coupler With Single-Stranded Multimode Fiber Waveguides", *Applied Optics*, vol. 15, No. 11, Nov. 1976, pp. 2629–2630.

Primary Examiner—Richard V. Fisher
Attorney, Agent, or Firm—Hill, Van Santen, Steadman & Simpson

[57] ABSTRACT

A method for manufacturing distributor and mixer elements for optical communications technology, which elements have at least two glass fiber light waveguides fused to one another along a given segment, characterized by the steps of forming a preform by arranging at least two fiber optical rods to extend parallel to each other, fusing the arranged rods to one another in at least one sharply limited longitudinal area, then subsequently heating the preform and drawing the elements therefrom.

9 Claims, 2 Drawing Figures

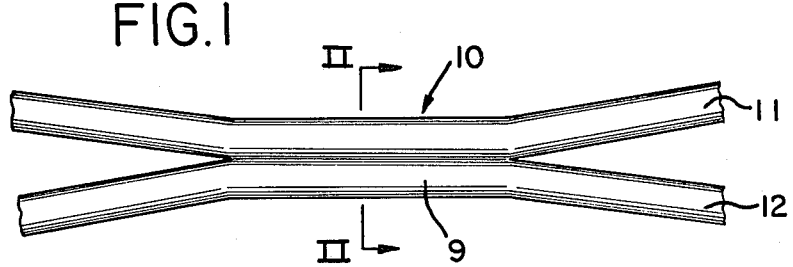
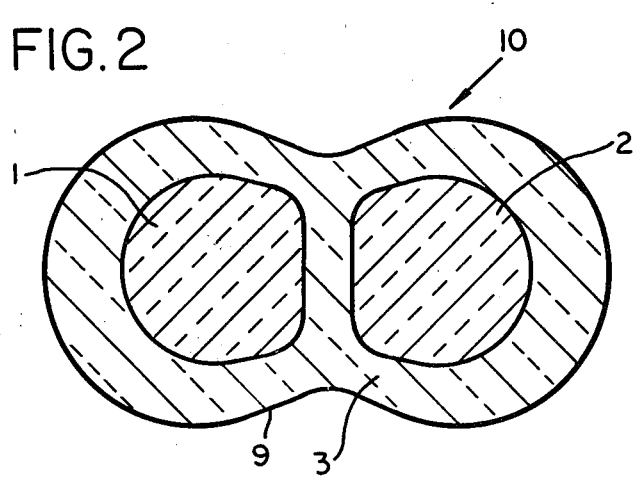

METHOD FOR MANUFACTURING DISTRIBUTOR AND MIXER ELEMENTS FOR OPTICAL COMMUNICATION TECHNOLOGY

BACKGROUND OF THE INVENTION

The present invention is directed to a method for manufacturing distributor and mixer elements for an optical communication technology in which two glass fiber light waveguides are fused to one another for a given segment. The invention also is related to a method of manufacturing a preform which is used to form the distributor and mixer elements.

A proposed distributor element has been disclosed in M. K. Barnoski et al, "Fabrications of an Access Coupler With Single Strand Multimode Fiber Waveguides", *Applied Optics,* Vol. 15, No. 11, November 1976, pages 2629-30. This distributor element consists of two multimode glass fibers which are fused together over a length of few centimeters by use of a $CO_2$ laser. This type of manufacture of the distributor, however, has several difficulties with providing a reproduceable coupling condition and for controlling the fusing process.

SUMMARY OF THE INVENTION

The present invention is directed to providing a method for producing distributor and mixer elements which have at least two parallel extending glass fiber light waveguides which are fused together for at least a given distance and which method provides excellent reproducibility for the coupling conditions and a process which is easy to control.

To obtain these objects, the invention is directed to a method for manufacturing distributor and mixer elements for optical communication technology in which elements at least two parallel extending glass fiber light waveguides are fused to one another segment-wise. The method comprises the steps of providing a preform by arranging at least two optical glass rods to extend parallel to each other, and fusing the arranged rods to one another in at least one sharply limited longitudinal area spaced from the ends of the rods, then subsequently heating the preform and drawing the elements having a fused segment with free fibers extending from each end of the segment from said heated preform.

The significant advantage of this solution lies in the fact that the preform has a significantly greater size as compared to the actual element and thus the fusing process can be controlled with considerable more precision. This precision in the fusion process enables a greater precision in determining the coupling conditions.

A particular simple and precise method for manufacturing the preform from which the distributor and mixer elements are drawn is by the step of the fusing being sharply limited to a specific heating zone. Advantageously, the sharply limited heating zone can be generated either by utilizing a heating wire to cause the fusion, by utilizing a laser to cause the fusion or by utilizing an oxy-hydrogen burner which has a sharply limited heating zone. In addition, the sharply limited heating zone can be created either by utilizing a heating wire in combination either with a laser, with an oxy-hydrogen burner or with both a laser and oxy-hydrogen burner or by utilizing a laser in combination with an oxy-hydrogen burner.

BRIEF DESCRIPTION OF THE DRAWINGS

FIG. 1 is a plan view of a distributor and/or mixer element, which has a coupling zone of two fiber cores in a common glass jacket with the fiber extending from each end of the zone and which element is produced in accordance with the method of the present invention; and FIG. 2 is an enlarged cross-section of a view taken on line II—II of FIG. 1 of the coupling zone.

DESCRIPTION OF THE PREFERRED EMBODIMENTS

The principles of the present invention are particularly useful in the coupling zone 9 of a distributor or mixer element generally indicated at 10 in the Figure. As illustrated in FIG. 2, the coupling zone 9 of the element 10 has a pair of glass fiber cores 1 and 2 with a common fused together glass jacket 3.

In order to manufacture the element 10, one utilizes a preform which consists of two optical glass rods which are placed to extend parallel to one another and are then fused to one another at various points along the longitudinal axis in sharply limited areas for example one to two millimeters in length. This preform is then subsequently heated and drawn into a fiber by utilizing a fiber drawing system for drawing fibers from optical rods. Such drawing systems are generally known.

In such a drawing system, the preform is held by a support mount in a such a manner that the lower end of the preform of the glass rods is situated in the heating zone in which the glass is either melted or greatly softened. Such a heating zone is generally created by an inductively heated, annular heating body, for example a carbon susceptor and thus, the heating zone is situated inside of the annular heating element. Depending upon whether the glass rods of the preform are fused at their lower end or not, one or two fibers are drawn from the lower end of the rods, for example by means of a C-drum. A forward feed mechanism of the system maintains the lower end of the preform, which continuously grows shorter during the drawing operation, in the heating zone. The fiber structure drawn from such a preform will consist of two individual fibers 11 and 12 in the area of the preform which was not fused together and a single fiber which more precisely is a fused double fiber in the fused areas. The fused double fiber forms a coupling segment or zone 9 of element 10. The individual distributor or respectively mixer elements can be simply manufactured in such a manner that the fiber structure is cut between the coupling segments. Such an element 10 then exhibits free fiber ends 11 and 12 that extend from each end of the coupling zone 9 or segment and facilitate coupling in and coupling out of the optical signal.

The fiber structure or respectively the distributor and mixer structure can be manufactured of multi-component glass for example lead glass or silica glass. The preform consists of glass rods which can be very simply manufactured in such a manner that the glass rods consisting of multi-component glass are locally fused for example by means of a platinum wire which is 2 mm thick and is brought to a temperature of approximately 1100° C. by means of resistant heating. Upon employment of the silica glass rods, the fusing can also occur with a sharply limited heating zone for example with a $CO_2$ laser or with an oxy-hydrogen gas burner.

The cross-section of the coupling region of the drawn distributor and mixer element when magnified approximately 600 times would be the size illustrated in the Figure. This element was drawn from a preform of two glass rods which consist of lead glass which were fused at the periodic intervals. The glass rods had a diameter of 6 mm and were fused to one another over a length of approximately 2 mm. A fiber optical structure of approximately 20 meters long was drawn from this preform. The length of the coupling segments or regions can be significantly shortened when using thinner optical glass rods and shorter fusion regions. The coupling ratio can be varied with respect to the thickness of the fiber jacket or respectively the jacket of the glass rods. In the illustrated element 10, the contours of the parallel extending glass cores 1 and 2 as well as the common glass jackets precisely corresponds to the contour of a photograph cross-section of the double fiber.

Although various minor modifications may be suggested by those versed in the art, it should be understood that we wish to embody within the scope of the patent granted hereon, all such modifications as reasonably and properly come within the scope of our contribution to the art.

We claim:

1. A method for manufacturing distributor and mixer elements for optical communications technology, which elements have at least two glass fiber light waveguides fused to one another along a given segment with free fiber ends extending from each end of the segment, said method consisting of the steps of forming a preform for drawing a fiber by arranging at least two glass rods to extend parallel to each other, fusing the arranged rods to one another in at least one sharply limited longitudinal area spaced from the ends of the rods, then subsequently heating the preform and drawing the elements having a fused segment with free fibers extending from each end of the segment from said heated preform.

2. A method according to claim 1, wherein the step of fusing the arranged glass rods comprises heating in a sharply limited heating zone.

3. A method according to claim 2, wherein the step of heating in a sharply limited heating zone utilizes a heating wire to cause the fusing of the glass rods.

4. A method according to claim 2, wherein the step of heating in a sharply limited heating zone is accomplished by utilizing a laser.

5. A method according to claim 2, wherein the step of heating in a sharply limited heating zone utilizes an oxyhydrogen burner with a sharply limited heating zone.

6. A method according to claim 2, wherein the step of heating in a sharply limited heating zone utilizes a heating wire in combination with a laser.

7. A method according to claim 6, which includes utilizing an oxy-hydrogen burner with a sharply limited heating zone in combination with the laser and heating wire for heating the rods in a sharply limited heating zone.

8. A method according to claim 2, wherein the heating in a sharply limited heating zone utilizes a laser and an oxy-hydrogen burner having a sharply limited heating zone.

9. A method according to claim 2, wherein the step of heating a sharply limited heating zone utilizes a heating wire in combination with an oxy-hydrogen burner with a sharply limited heating zone.

* * * * *